Aug. 24, 1926.  1,597,216
W. E. STOKES

PROCESS OF TREATING VANADIUM ORES AND SOLUTIONS

Filed Jan. 19, 1921  2 Sheets—Sheet 1

I (Solution of Soluble Vanadates)

→ Precipitate Soluble Vanadates (Reagent $PbCl_2$ in Excess)

Filter
    Precipitate      Filtrate
    Lead Vanadate      Water + NaCl (Waste)

Decompose Lead Vanadate (Reagent $NH_4Cl + HCl$)

Filter
    Precipitate      Filtrate
    $V_2O_5$ + absorbed $PbCl_2$ + $NH_4Cl$      $PbCl_2$ + $NH_4Cl$
    (Optional Final Product)      acidify
                             $PbCl_2$     $NH_4Cl$ — To Purify —

Wash Precipitate ($V_2O_5$) with $NH_4Cl$ Solution ←
$V_2O_5$ + absorbed $NH_4Cl$      Wash Water
                             $PbCl_2$ + $NH_4Cl$
Heat to Volatilize $NH_4Cl$      acidify
$V_2O_5$ (pure)      $NH_4Cl$    $PbCl_2$   $NH_4Cl$
Final Product Inventor:
William E. Stokes
By Fraser Turk & Myers
Attorneys.

Aug. 24, 1926.  
W. E. STOKES  
1,597,216  
PROCESS OF TREATING VANADIUM ORES AND SOLUTIONS  
Filed Jan. 19, 1921  2 Sheets-Sheet 2

II (Solution of Soluble Vanadates)

→ Precipitate Soluble Vanadates (Reagent $PbCl_2$ in Excess)

Filter
- Precipitate: Lead Vanadate
- Filtrate: Water + NaCl Waste

Decompose Lead Vanadate   (Reagent $NH_4Cl + HCl$) ← + acid in Excess

Filter
- Precipitate: Lead Chloride
- Filtrate: $V_2O_5 + NH_4Cl + HCl$
  - Reduce acidity ($NH_3$) ←
  - Precipitate: $V_2O_5$    Filtrate: $NH_4Cl$
  - (Optional Final Product)

— To Purify —

→ Dissolve $V_2O_5$ in Acid + Alcohol
- Solution: $V_2O_5 + HCl + Alcohol$
- Precipitates: Impurities $PbCl_2$ etc.

Neutralize Solution with Ammonia → add Caustic Soda
Solution $V_2O_5 + NH_4Cl + Alcohol$   and heat
$NH_3$ evolved
$NH_4Cl + NaOH = NaCl + NH_4OH$ → Distill —— Alcohol Evaporated
Residue $V_2O_5 + NH_4Cl$ Heat to Volatilize Ammonium Salt
- Residue: $V_2O_5$ pure — Final Product
- Vapor: $NH_4Cl$ Inventor,
William E. Stokes
By Fraser Turk & Myers
Attorneys.

Patented Aug. 24, 1926.

1,597,216

UNITED STATES PATENT OFFICE.

WILLIAM E. STOKES, OF ROCKVILLE CENTER, NEW YORK, ASSIGNOR TO UNITED STATES PROCESSES, INC., OF NEW YORK, N. Y., A CORPORATION OF NEW YORK.

PROCESS OF TREATING VANADIUM ORES AND SOLUTIONS.

Application filed January 19, 1921. Serial No. 438,465.

This invention relates to the recovery of vanadium, and aims to provide improvements therein.

The present invention provides a process, and sub-processes, wherein there is a good recovery of the vanadium constituent from ores or solutions, the recovery being better than that derived by previously known processes. The invention also provides for the recovery of vanadium salts of great purity, which purity may be that known as chemical purity.

The invention further provides a process wherein the use of fuel is reduced, or relatively small.

The invention further provides a process which is cyclic, and wherein the principal reagents which are used may afterwards re-enter the process, only incidental replacements of said reagents for working losses being required.

According to the present invention, the vanadium ore is leached, to dissolve the vanadium compound. In the case of refractory ores, the ores may be subjected to a preliminary roast or fusion with a transposing agent, such as sodium chloride or carbonate, according to any well-known method.

The solutions thus obtained are usually very dilute, usually not containing more than one per cent of vanadium, and usually containing a considerably less percentage of vanadium. Only a limited recovery of the vanadium constituent from such dilute solutions is obtained by the usual methods now in use. As the recovery of vanadium is now usually carried out, the practice is to concentrate the solution by heat evaporation. In the evaporation of large quantities of solution, the fuel used is a large item of expense.

In order to avoid this large use of fuel, according to the present invention, use is made of a reagent which will precipitate the vanadium constituent in a form which is extremely insoluble in the solution. Soluble salts, such as the chlorides, acetates or nitrates of barium, lead, copper, or iron are added to form a vanadate of low solubility, and, hence, precipitate to an extent which practically completely exhausts the solution. Under the expression "vanadate" is to be understood any of the vanadates which the metallic or base-forming element is capable of forming with the vanadium compound.

The precipitate is separated from the solution in a suitable manner, for example, by filtration.

After the precipitated vanadate has been separated from the mass of leach water, it is then decomposed; and the separation, as a precipitate, is effected, of either the vanadic oxid ($V_2O_5$), or of the base-forming element united with the vanadate.

A. The insoluble vanadate is treated with an acid. For example, a solution of hydrochloric acid may be added to the vanadate, the hydrochloric acid being in equivalent proportion to the vanadate. The acid and vanadate then have added thereto a salt, in the presence of which the vanadate readily dissolves, and, in the solution of which the resulting vanadic oxid has a slight solubility, such, for example, as an ammonium, sodium, calcium, or magnesium chloride or acetate, ammonium chloride being at present considered a preferable salt for this purpose. In an acid ammonium chloride solution, the insoluble vanadate readily dissociates, and the vanadic oxid which is formed precipitates, and can be separated in any suitable manner, by filtration for example. The lead chloride, for example, resulting from the action of the acid upon the insoluble vanadate, runs off in the filtrate, and the filtrate may be used again in the process. For example, the filtrate may be acidified, thus precipitating the lead chloride, which can be used again to precipitate the vanadium constituent from the solution resulting from leaching the ore, as heretofore explained. The ammonium chloride could be used again in the preceding step, wherein the dissociation of the lead vanadate is effected, and the liquid could be returned to the original solution of soluble vanadates. Any losses of vanadic oxid which might result from incomplete precipitation would be recovered, inasmuch as the vanadium constituent running off into the filtrate resulting from the dissociation step would be returned to the solution of the soluble vanadate obtained by the leaching step.

B. If, however, an excess of acid be added to the insoluble vanadate, the vanadic oxid resulting from the dissociation will not precipitate, but will remain in solution, and the salt resulting from the action of the acid on the base-forming element associated with the insoluble vanadate, lead chloride for example, will precipitate. The insolubility of the lead chloride is rendered greater by the addition of the ammonium chloride in the solution. The precipitate may be separated by filtration, and the lead chloride again used in a previous step of the process. The filtrate may be run off, and then be treated with ammonia. When the acidity has been reduced, the vanadic oxid will precipitate, and the vanadic oxid may be removed from the solution by filtration, and the filtrate, containing the ammonium salt, may be used again in connection with the acid used for dissociating the insoluble vanadate, or for washing the precipitated vanadic oxid.

The vanadic oxid thus precipitated may be used as the final product, or it may be purified.

A. To purify the vanadic oxid, it is preferably washed with water containing an ammonium salt, and thereafter heated to volatilize the ammonium salt contained in the absorbed water.

B. Or, the impure vanadic oxid may be dissolved in an acid which will dissolve the vanadic oxid, as, for example, hydrochloric or sulphuric, and alcohol or other liquid in which the impurities are insoluble and the dissolved vanadic oxid is soluble. The acid will act on any barium, calcium or lead salts which may be mixed with the vanadic oxid, and form insoluble salts, which will be completely precipitated in the alcohol, and can be separated by filtration. After the solution is filtered, to remove the foreign salts, it is treated with ammonia, or an ammonia solution, to neutralize the acid, in which solution of the ammonium salt of the acid, the vanadic oxid is insoluble, and precipitates. The precipitated vanadic oxid may be removed by filtration, the filtrate distilled to recover alcohol, and the ammonium salt remaining in the solution, together with the separated alcohol, may be used again in the process, for example, the ammonium salt may be used as one of the reagents for dissociating the insoluble vanadate, described above. The vanadic oxid is then preferably heated, to volatilize the ammonium salt.

The accompanying drawings show two specific examples of the present process.

The following is a description of a particular example of the process:

A solution of vanadium salt is obtained, by leaching for example. The solution may be neutral, or alkaline, or acid, though a neutral or alkaline condition is to be preferred.

Lead chloride is then added to the leach solution, which acts upon the soluble vanadate to form lead vanadate. The lead vanadate, being very insoluble, is precipitated. The lead chloride may be used in excess, and good results are obtained by using 5 parts by weight of lead chloride to one part of vanadic oxid ($V_2O_5$). The lead vanadate settles easily, and it may be removed from the spent leach water by filtration. The precipitated lead vanadate is then preferably washed, to remove impurities, and the lead vanadate is then one of high purity.

In order to recover the vanadium in the form of vanadic oxid, the lead vanadate is mixed with water, and sufficient hydrochloric acid, to form lead chloride with the lead of the lead vanadate. To this solution, either simultaneously or separately, with the addition of the hydrochloric acid, there is added ammonium chloride. Enough ammonium chloride is added to make a saturated solution.

In practice, a solution of ammonium chloride is preferably made separately from the acid solution containing the decomposed lead vanadate, and the acid solution containing the decomposed lead vanadate is added slowly, with stirring, to the ammonium chloride solution. The ammonium chloride solution is preferably maintained at boiling temperature. The boiling is continued until the lead vanadate is entirely decomposed and the vanadic oxid precipitated, the vanadic oxid being practically insoluble in the solution of ammonium chloride.

The precipitated vanadic oxid is then separated from the solution, preferably by filtration, and the filtration is preferably carried out while hot, to prevent lead chloride crystallizing out and contaminating the vanadic oxid.

The precipitate ($V_2O_5$) is then preferably washed with water containing ammonium chloride, and the vanadic oxid is thereafter heated, to drive off the water and ammonium chloride, the vanadic oxid which is left then being of high purity.

The filtrate, containing ammonium chloride and lead chloride, is preserved and preferably acidified, to precipitate the lead chloride, which is returned to the process, being used to again precipitate the lead vanadate. The ammonium chloride may also be used again in the step wherein the lead vanadate is dissociated.

As an alternative method of purifying the precipitated vanadic oxid, the vanadic oxid may be dissolved in hydrochloric acid, together with alcohol. The hydrochloric acid will act upon any lead contained in the vanadic oxid, and convert it into lead chloride, which lead chloride, being insoluble in alcohol, will precipitate in the solution, and may be separated therefrom by filtration. The filtrate is then treated with a solution of ammonia, to neutralize it, and then heated to distill off the alcohol. The vanadic oxid precipitates in the presence of the ammonium salt solution, and is separated by filtration. The precipitated vanadic oxid is then heated to volatilize the ammonium chloride, the vanadic oxid which is left being of high purity.

The filtrate containing the ammonium salt is retained and returned to the process; for example, to the step wherein the lead vanadate is dissociated, or sodium hydroxid may be added and the solution heated to convert the ammonium chloride into ammonium hydroxid and ammonia evolved, and utilized to neutralize the acid in the step succeeding the step where the acid and alcohol are used for purifying the vanadic oxid.

The invention is not limited to the specific procedure herein described, and steps and sub-combinations of steps may be employed, separately from the complete process described. The inventive ideas may receive expression in a variety of specific procedures.

What is claimed is:—

1. In a process of recovering vanadium which consists in adding a lead salt to a leach solution containing a soluble vanadium compound to precipitate lead vanadate, separating the precipitate from the solution, decomposing the precipitate by an excess of acid in a salt solution in which the resulting vanadium oxid is soluble and the lead salt is insoluble, separating out the lead salt, and treating the solution to reduce its acidity to precipitate the vanadium oxid.

2. In a process of recovering vanadium, decomposing an insoluble vanadate by an acid in a salt solution in which the resultant vanadic oxid is insoluble, separating the vanadic oxid from the solution, dissolving the vanadic oxid in an acid in the presence of an organic liquid, separating the resulting precipitates from the solution and neutralizing the acid solution to precipitate the vanadic oxid.

3. In a process of recovering vanadium, dissolving in an acid in the presence of an organic liquid vanadic oxid contaminated with salts formed by the base forming element of the vanadate from which the vanadic oxid was obtained, separating the liquid from the resulting precipitates, and neutralizing the acid in the solution to precipitate the vanadic oxid.

In witness whereof, I have hereunto signed my name.

WILLIAM E. STOKES.